US008175949B2

(12) United States Patent
Drouin

(10) Patent No.: US 8,175,949 B2
(45) Date of Patent: May 8, 2012

(54) METHODS AND SYSTEMS FOR PROVIDING A CONSTANT MATURITY COMMODITY INDEX

(75) Inventor: Jerome Drouin, London (GB)

(73) Assignee: UBS AG, Zurich (CH)

( * ) Notice: Subject to any disclaimer, the term of this patent is extended or adjusted under 35 U.S.C. 154(b) by 822 days.

(21) Appl. No.: 12/216,876

(22) Filed: Jul. 11, 2008

(65) Prior Publication Data

US 2009/0132411 A1    May 21, 2009

Related U.S. Application Data

(60) Provisional application No. 60/935,185, filed on Jul. 30, 2007.

(51) Int. Cl.
    *G06Q 40/00* (2012.01)
(52) U.S. Cl. ......................... 705/36 R; 705/35
(58) Field of Classification Search ........................ None
    See application file for complete search history.

(56) References Cited

U.S. PATENT DOCUMENTS

| | | | | |
|---|---|---|---|---|
| 6,061,661 | A * | 5/2000 | Hagan ........................ | 705/36 R |
| 7,584,130 | B1 * | 9/2009 | Schluetter ................... | 705/35 |
| 7,624,062 | B1 * | 11/2009 | Kelly et al. ................. | 705/37 |
| 7,739,186 | B1 * | 6/2010 | Gerber ........................ | 705/37 |
| 7,752,106 | B1 | 7/2010 | Corby et al. | |
| 2002/0007329 | A1 * | 1/2002 | Alcaly et al. ................ | 705/35 |
| 2003/0093356 | A1 * | 5/2003 | Kaufman .................... | 705/37 |
| 2004/0024684 | A1 * | 2/2004 | Montepeque ................ | 705/37 |
| 2004/0024692 | A1 * | 2/2004 | Turbeville et al. .......... | 705/38 |
| 2004/0199451 | A1 * | 10/2004 | Benning et al. ............. | 705/37 |
| 2004/0236661 | A1 * | 11/2004 | Benning ..................... | 705/37 |
| 2005/0080704 | A1 | 4/2005 | Erlach et al. | |
| 2005/0086152 | A1 * | 4/2005 | Sweeting .................... | 705/37 |
| 2005/0102214 | A1 * | 5/2005 | Speth et al. ................. | 705/36 |
| 2005/0119962 | A1 * | 6/2005 | Bowen et al. ............... | 705/37 |
| 2005/0144061 | A1 | 6/2005 | Rarity et al. | |
| 2005/0216384 | A1 | 9/2005 | Partlow et al. | |
| 2006/0036533 | A1 | 2/2006 | Frankel et al. | |
| 2006/0212384 | A1 * | 9/2006 | Spurgin et al. .............. | 705/37 |
| 2006/0247996 | A1 * | 11/2006 | Feldman ..................... | 705/35 |
| 2006/0253360 | A1 * | 11/2006 | Gould ......................... | 705/35 |
| 2007/0078738 | A1 * | 4/2007 | Levin et al. ................. | 705/36 R |
| 2007/0203855 | A1 * | 8/2007 | Fisher ......................... | 705/36 R |
| 2007/0271196 | A1 * | 11/2007 | Blitzer et al. ............... | 705/36 R |

(Continued)

FOREIGN PATENT DOCUMENTS

WO    WO 2006050418 A2 *    5/2006

OTHER PUBLICATIONS

Buyer's Guide to Managing Price Risk; Chicago Board of Trade; 1996; 44-pages.*

(Continued)

*Primary Examiner* — Gregory Johnson
(74) *Attorney, Agent, or Firm* — Finnegan, Henderson, Farabow, Garrett & Dunner LLP

(57) ABSTRACT

Methods and systems provide a commodity index for investing. In one implementation, a method selects a commodity component for inclusion in the commodity index and calculates a target weight of the commodity component. The method further selects a time interval for maturity of the commodity component to be fixed at from a current date. Financial instruments may be purchased corresponding to the commodity component.

16 Claims, 18 Drawing Sheets

FIG. 8

U.S. PATENT DOCUMENTS

| | | | |
|---|---|---|---|
| 2008/0010221 A1* | 1/2008 | Co et al. .................... | 705/36 R |
| 2008/0059358 A1* | 3/2008 | Wardley et al. .............. | 705/37 |
| 2008/0091583 A1* | 4/2008 | Gorton et al. ............... | 705/36 R |
| 2008/0097877 A1* | 4/2008 | Rahal ........................... | 705/30 |
| 2008/0177675 A1* | 7/2008 | Arginteanu ................. | 705/36 R |
| 2008/0249956 A1* | 10/2008 | Connors ..................... | 705/36 R |
| 2008/0288416 A1 | 11/2008 | Arnott et al. | |

OTHER PUBLICATIONS

Buyers Guide to Managing Price Risk; Chicago Board of Trade; 1996; 44-pages.*

Futures expiration, contract switching, and price discovery; Chatrath, Arjun; Christie-David, Rohan; Journal of Derivatives, 12 , 1 , 58(15); Fall 2004; 26-pages.*

Agricultural Trade Leads; Journal of Commerce; May 22, 1996; 13-pages.*

International Search Report and Written Opinion dated Oct. 2, 2008 in corresponding PCT Application No. PCT/US/08/09092, 8 pages.

Vachris, Michelle A., et al., "International Price Comparisons Based on Purchasing Power Parity," Monthly Labor Review; vol. 122. No. 10, Oct. 1999, 10 pages.

\* cited by examiner

METHODS AND SYSTEMS FOR PROVIDING A CONSTANT MATURITY COMMODITY INDEX

RELATED APPLICATION(S)

This application claims the benefit of priority to U.S. Provisional Patent Application No. 60/935,185, filed on Jul. 30, 2007, the disclosure of which is expressly incorporated herein by reference, in its entirety.

TECHNICAL FIELD

The present invention generally relates to the field of investing and computerized systems and methods for investing. More particularly, and without limitations, the invention relates to systems and methods for investing in commodities using a commodity index, such as a constant maturity commodity index.

BACKGROUND

Generally speaking, commodities are an alternative investment class to other financial assets, such as bonds and stocks. Investing in commodities, in addition to other financial assets, has provided investors an opportunity to diversify their portfolios. Investing in commodities may provide long run returns like investing in bonds and stocks, but commodity prices are generally not correlated with prices of bonds and stocks.

One approach for investing in commodities has been through indices that rely only on front month contracts. A front month contract is a futures contract that represents an agreement to buy or sell a particular commodity at a predetermined price at a date of maturity in the future. A front month contract is repeatedly bought at the same distance on a forward curve. For example, as illustrated in FIG. 1, the distance out on a forward part 101 of the curve is the time at which a futures contract is bought 101b before it matures 101a. Time to maturity is the time (measured in days or months) until a futures contract is due. The time until a futures contract matures at the time it is bought is also called the tenor of a futures contract.

A second approach for investing in commodities has been to use baskets of futures that provide exposure further out on the forward curves. A basket of futures is a commodity index composed of different futures contracts.

Experience with these investment strategies has demonstrated some common drawbacks. First, these investment strategies have led to problems in an environment with unusually steep contango curves responsible for large negative roll yields (see, for example, FIG. 2). In such an environment, the value of the commodity varies significantly in terms of spot price and futures contract over time.

By way of example, FIG. 2 is a graph illustrating a contango curve 200. There is an X axis 201 that represents time to maturity for a forwards contract. The Y axis 202 represents the cost or price of the forward contract. A contango environment occurs when a current price 203 of a futures contract is above the expected future spot price, since a current spot price 204 is below the price of the futures contract. A spot price is the current price a particular commodity can be bought or sold at a certain time and place. When this happens, there will be a negative roll yield, when the futures contract matures. A negative roll yield is a loss on an investment. This is partly because roll of front month contracts exposes investments only to the front-end of the curve (see FIG. 1, 101). A negative roll yield occurs from a roll of front month contracts when a futures contract is bought at a higher price 101b and sold at a lower price when the front month contract matures at a certain point in the future 101a. Then a futures contract is bought with the same tenor as that of the futures contract bought at 101b and therefore will take the same time to mature.

Backwardation is the opposite of contango. FIG. 3 is a graph 300 illustrating an example of a backwardation curve 304. There is an X axis 301 that represents time to maturity for a futures contract. The Y axis 302 represents the price of the futures contract. Backwardation occurs when the spot price 303 for a commodity is higher then the price of a futures contract 304 for the commodity. It is possible to take advantage of a backwardation by selling at the spot price 303 and buying the futures contract 304. This strategy is possible when an investor owns the actual physical commodities and does not have to use them immediately and, therefore, can deliver them at spot 303. However, an investor in a traditional commodity indices eventually may have to exit such a strategy since he may not be able to deliver the commodities at spot price 303 when futures contract 304 matures. The investor would be able to take advantage of backwardation if physical delivery of the commodity was not necessary.

Additional drawbacks of baskets of futures include a lack of transparency, absence of weight control, and absence of rebalancing. By lack of transparency, it is meant the inability, or difficulty, of monitoring the details of investments. Weight control is the ability to assign the proportion, weight, of a particular futures contract in a basket, commodity index. Rebalancing ensures that the weight of the futures contract in a commodity index remains the same, as the price of the futures contract fluctuates over time.

An attempt to solve the above problems has led to approaches that include the use of rule based indices. However, these approaches are increasingly complex and provide little flexibility or choice.

In view of the foregoing, there is a need for an improved solution for investing in commodities. In particular, there is a need for methods and systems for providing a constant maturity index, where the investor may escape the limitation of nearby only vehicles embodied by other major commodity indices and escape being locked into a potentially undesirable part of the curve. Nearby only vehicles refer to buying front month contracts with the same tenor and waiting until they mature before repeating the process. The solution should provide the investor with the ability to invest in an index that is diversified across a wide range of commodities, provides choices as to the tenor of their investment, has continuous roll and constant maturity features to mitigate negative roll yield in a contango environment and be able to take advantage of a backwardation environment, and more accurately reflects the real commodity markets. Continuous roll and constant maturity refers to continuously buying and selling futures contracts at different tenors, and not necessarily waiting till a front month (futures) contract matures. For example, a front month contract may be bought at point 102b that matures at point 101a. However, the proposed solution would allow to sell the front month contract at point 102a after a certain period of time 102. Finally, the index should be continuously rebalanced to target more consistent weights for the index's components, and the weights of the individual components should be maintained so that the index reflects changes in the market affecting the various components.

SUMMARY

The present invention provides methods and systems for investing in commodities. This is achieved by providing a Constant Maturity Commodity Index ("CMCI"). A constant maturity index may limit exposure to contango.

In one exemplary embodiment, a method is provided including, for example, selecting a commodity component for inclusion in the commodity index; calculating a target weight of the commodity component; selecting a time interval for maturity of the commodity component to be fixed at from a current date; determining a middle delivery period for financial instruments for the commodity component at the time interval; purchasing the financial instruments based in relation to the middle delivery period; and rebalancing the financial instrument based on the target weight and the middle delivery period of the commodity component.

The exemplary method may further include selecting one or more sectors of the commodity index, wherein the commodity component is included in one of the sectors; determining a sector weight for each of the sectors; and maintaining the target weight. Maintaining may include calculating a new component nominal weight for the commodity component, wherein the target weight of the commodity component for a next period is equal to the component nominal weight, if it is a maintenance period, and maintaining occurs every second predetermined amount of time.

In another embodiment, the commodity component may be held in form of the financial instruments at a quantity in a proportion related to a time distance to a constant maturity tenor, rebalancing may occur every first predetermined amount of time; and the middle delivery period may be the mid-point between the first and last day of a delivery period for the financial instruments.

In another alternate embodiment, the financial instruments are not front month contracts.

In another exemplary embodiment, a method is provided including, for example, selecting sectors comprising the constant maturity index; selecting commodity components included in one of the sectors; calculating a tradable economic sector weight of the sector; calculating a target weight for a commodity component; purchasing financial instruments corresponding to the commodity component based on the target weight; rebalancing the financial instruments based on the target weight of the commodity component; and maintaining the target weight of the component.

In one embodiment, calculating the tradable economic sector weight of each of the sector may include: calculating a world aggregate economic weight of the sector; calculating a sector open interest weight of the sector; calculating a sector market volume weight of the sector; calculating a sector liquidity weight of the sector based on the sector open interest weight and the sector market volume weight; and calculating the tradable economic sector weight based on the world aggregate economic weight and the sector liquidity weight.

In another embodiment, calculating the target weight of the commodity component may include: calculating a market value of the components based on consumption data and price indicator, comprising determining whether to use world or regional data; calculating a component market volume weight of the component; calculating a component open interest weight of the component; calculating a combined component liquidity weight of the component based on the component open interest value and component market volume value; calculating a tradable market value weight of each of the sectors based on the market value weight and the combined component liquidity weight; and calculating the target weight of the component based on the tradable market value weight and the tradable economic sector weight. The component market volume weight may be equal to an average component market volume value and the component open interest weight may be equal to an average component open interest value.

In another alternate embodiment, the target weight may be based on factors comprising a market value consumption of the commodity component.

In another embodiment, selecting a commodity component may include: identifying the commodity component; determining whether the commodity component satisfies primary eligibility requirements; determining sources of data to use to determine if the commodity component meets secondary eligibility requirements; determining weight of the components in the index within the same sector as the commodity component; and determining whether the commodity component satisfies secondary eligibility requirements. The secondary eligibility requirements may include one or more financial thresholds based on liquidity.

In still another embodiment, determining whether the commodity component complies with primary eligibility requirements, may include at least one of: determining whether the component is physically deliverable into either a physical commodity or cash settled against a publicly available physical commodity reference price; determining whether the component is traded as an instrument, wherein the instrument may be a futures or forward instrument; determining whether the financial instruments for trading the commodity component are traded on an exchange that satisfies exchange eligibility requirements; determining whether the financial instruments feature clearly specified expiration dates and terms; determining whether the financial instrument are available for trading for at least a predetermined amount of time before expiration; determining that the instrument is neither a cash market nor a spot instrument; determining whether price and volume data has been available for the instrument for at least a predetermined amount of time before the current date; and determining whether the instrument satisfies criteria of calculability. The exchange eligibility requirements may include at least one of: the exchange is based in a country that satisfies country eligibility requirements; trading on the exchange has been free of any significant market disruptions involving a major commodity market participant for a predetermined disruption-free amount of time before the current date; daily settlement or closing prices for the instrument are made available by the exchange; and the instrument is available for trading for at least a predetermined minimum trading time each day on the exchange.

In another exemplary embodiment, a method is provided including, for example, selecting commodities for the commodity index; calculating a target weight for the commodities; identifying multiple individuals tenor components for a commodity, wherein an individual tenor component is a commodity at a certain maturity; calculating an individual tenor weight for the individual tenor component; and purchasing financial instruments corresponding to the individual tenor component based on the individual tenor weight.

The exemplary method may further include rebalancing the financial instruments based on the target weight of the commodity and the individual tenor weight of the individual tenor component; maintaining the target weight of the commodity and the individual tenor weight of the individual tenor component. Maintaining may include, for example, determining whether it is a maintenance period; determining whether it is a curve rebalancing period; calculating a target weight adjustment factor for the individual tenor component if it is a curve rebalancing period; and calculating the individual tenor weight for the individual tenor component based on the target weight adjustment factor.

In another embodiment, determining the individual tenor weight may include: calculating an equal tenor weight for the individual tenor component, the equal tenor weight is equal to the equal tenor weight of any other individual tenor component of the same commodity; calculating a liquidity tenor weight for the individual tenor component; and calculating the individual tenor weight based on the equal tenor weight and the liquidity tenor weight.

In another embodiment, calculating the liquidity tenor weight may include: calculating a component tenor market volume weight for the individual tenor component; calculating a component tenor open interest weight for the individual tenor component; and calculating the liquidity tenor weight based on the component tenor market volume weight and the component tenor open interest weight.

In another embodiment, calculating a component tenor market volume weight for the individual tenor component may include: calculating a tenor market volume value based on a market volume and tenor of the individual tenor component over a liquidity reference period; calculating an average tenor market volume value of the individual tenor component based on the tenor market volume value; and calculating the component tenor market volume weight based on the average tenor market volume value.

In yet another embodiment, calculating a component tenor open interest weight for the individual tenor component may include: calculating a tenor open interest value based on the value of the open interest and tenor of the individual tenor component over the liquidity reference period, calculating an average tenor open interest value for the individual tenor component based on the tenor open interest value. calculating the component tenor open interest weight based on the average tenor open interest value.

It is to be understood that both the foregoing general description and the following detailed description are exemplary and explanatory only and are not restrictive of the embodiments of the invention, as claimed.

BRIEF DESCRIPTION OF THE DRAWINGS

The accompanying drawings, which are incorporated in and constitute a part of this disclosure, illustrate embodiments and aspects of the present invention. In the drawings.

DETAILED DESCRIPTION

Figure 1:
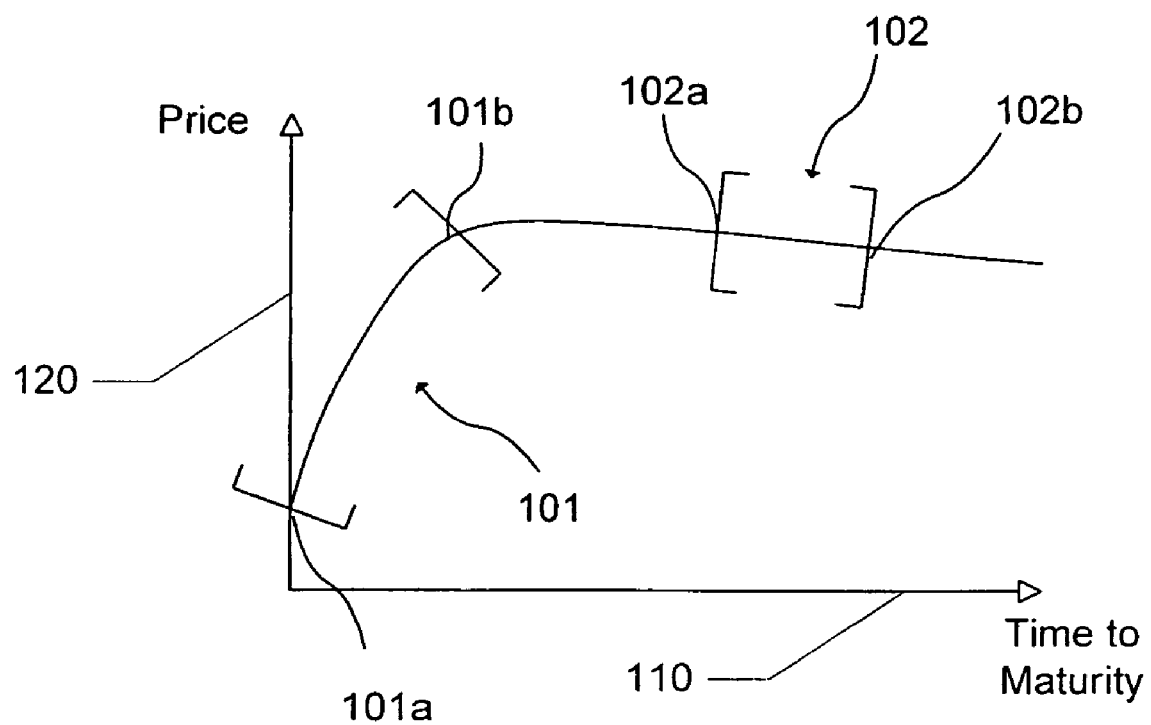
FIG. 1 is a graph of an example contrasting a traditional investment strategy with an investment strategy consistent with an embodiment of the present invention.
Figure 2:
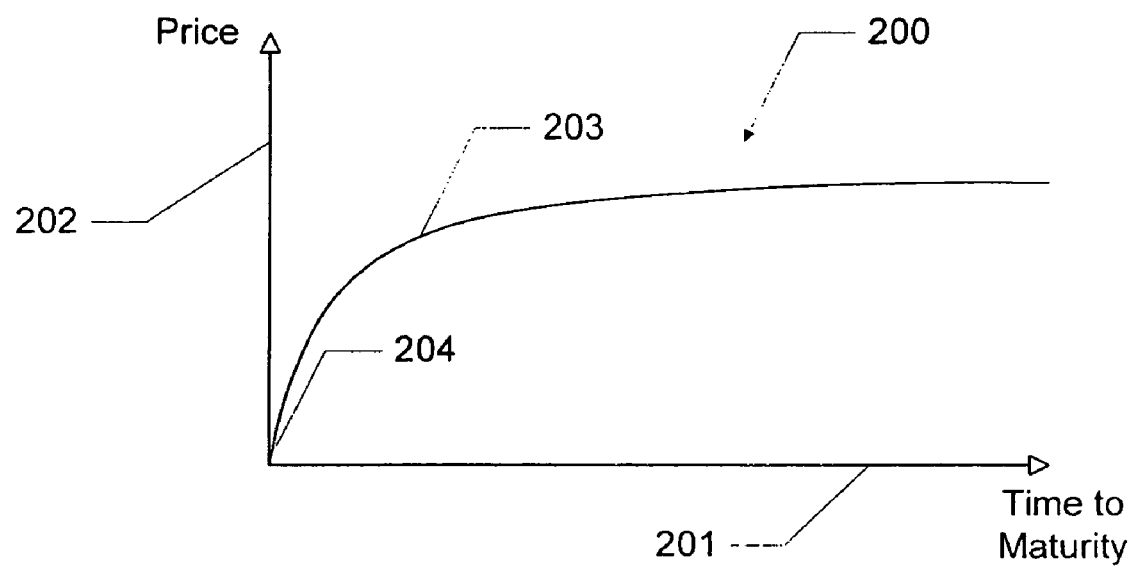
FIG. 2 is a graph illustrating the concept of contango.
Figure 3:
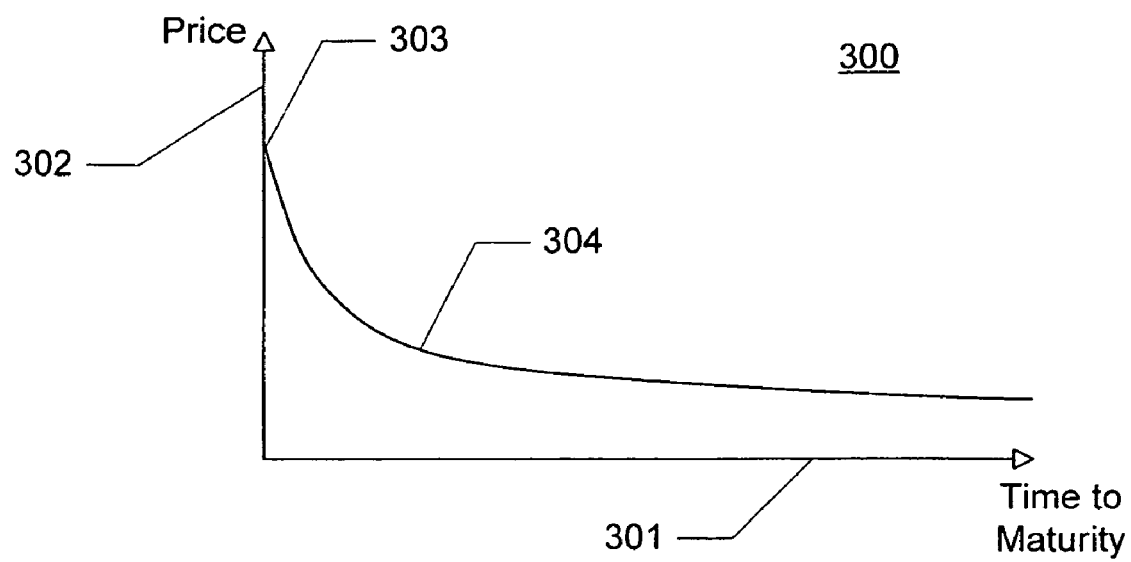
FIG. 3 is a graph illustrating the concept of backwardation.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions, or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

FIG. 1 is a graph of an example contrasting a traditional investment strategy with an investment strategy that is consistent with an embodiment of the present invention. In FIG. 1, there is an X axis 110 that represents time to maturity for a futures contract. The Y axis 120 represents the cost of the futures contract. The curve represents the cost or price of the futures contract based on the time it has to mature. Financial instruments, corresponding to a futures contract, may be bought farther out on the curve at point 102b to invest in futures contracts that have a longer time to mature. The financial instruments may be sold at point, for example, 102a that is before the point of time when the futures contracts mature at point 101a. This allows to invest in a different part 102 of a curve then the part of the forward part 101 of curve one would invest in with a traditional front month contract.

Figure 4:
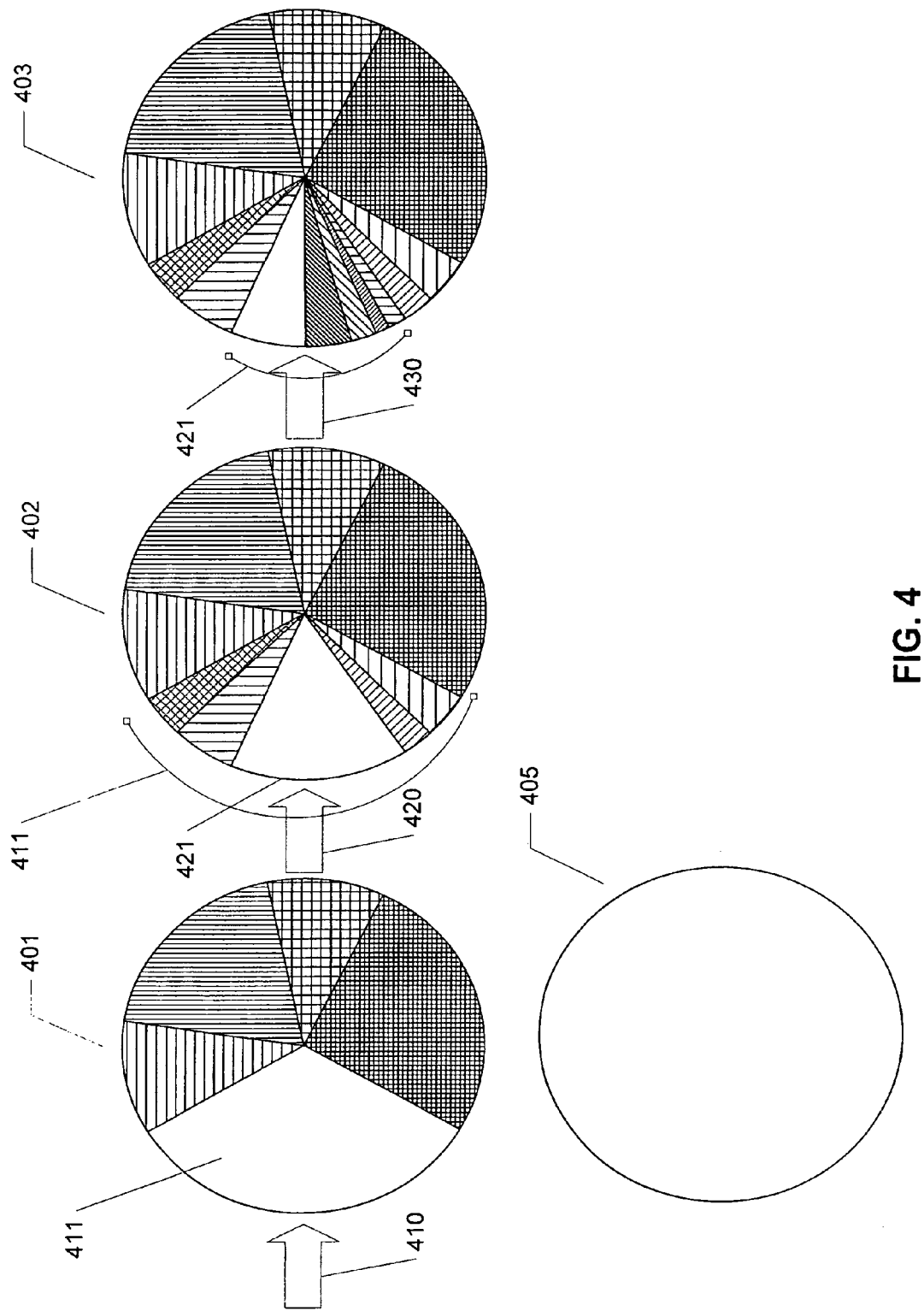
FIG. 4 depicts an example of weighting of a commodity index, consistent with an embodiment of the present invention.

FIG. 4 illustrates an example of selecting and weighting different financial instruments (components) that will make up a commodity index, consistent with an embodiment of the present invention. A financial instrument represents a futures contract for a certain commodity at a certain tenor. First, the different sectors that may comprise the commodity index are selected and weighed (410). A commodity index may be divided into one or more sectors. Examples of possible sectors include, but are not limited to, energy, industrial metals, precious metals, agricultural, livestock, and basic materials (lumber, rubber, etc.). The pie chart 401 illustrates an index divided into five different sectors, where each slice within the pie chart is a different sector. Each of the sectors has a different weight within the index. In this example, in total, five different sectors together represent 100% of the commodity index. If, for example, a commodity index was composed of only sector 405, the weight of sector 405 would be 100% of the whole commodity index.

After the sector(s) are selected and weighed, the components that comprise each sector are selected and weighed (420). A sector may be composed of one or more commodity components. Pie chart 402 represents a commodity index that is divided into five sectors, with sector 411, which was selected and weighed (410), being divided into five different commodity components. This means that five different commodity components were selected for sector 411. Each slice of sector slice 411 (as illustrated in pie 401) is a different commodity component with a different weight 402. For example, if group 411 represents the energy sector, each one of the slices in sector slice 411 in pie chart 402 may be one of the following components: propane, crude oil, natural gas, heating oil, sugar, or any other commodity that is determined to be in the energy sector and qualifies to be in the index. Furthermore, the commodity represented by each slice in group 411 may be a specific type of that commodity. Therefore, for example, two of the slices in group 411 may represent two different types of crude oil that are exchanged as different financial instruments corresponding to a broad category for a commodity. One or more commodities for the four other sectors are also selected, and a weight is determined for each one of the commodity components.

In one embodiment, a tenor is selected for each one of the commodities. A commodity at a certain tenor is a commodity component of the index. A financial instrument with the selected tenor is bought for the commodity component. In an alternate embodiment, one or more tenors are selected and weighed for each commodity component within each sector (430). Pie chart 403 represents a commodity index divided into five different sectors. One of the sectors in pie chart 403 is divided into five different commodity components, and one of the commodity components 421 is split into five different individual tenor components of the same commodity but with different maturities. Examples of maturities (tenor) include 3 months, 6 months, 1 year, 2 years, and 3 years. Financial instruments are bought for each one of the slices (each one at a different tenor) within component 421 based on the weight of the individual tenor component (commodity component at the certain tenor).

Figure 5:
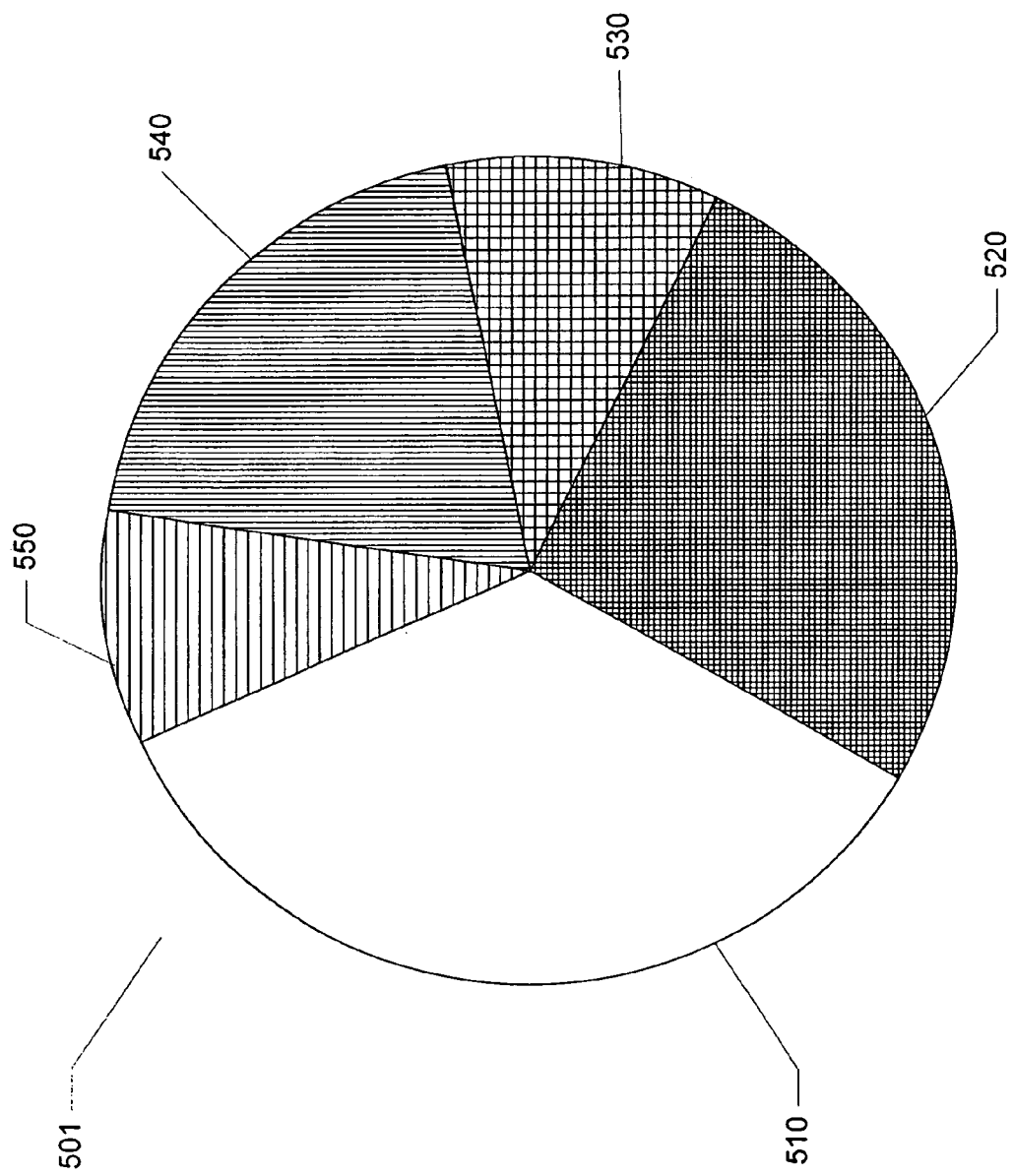
FIG. 5 depicts an example of weighting sectors of a commodity index, consistent with an embodiment of the present invention.
Figure 6:
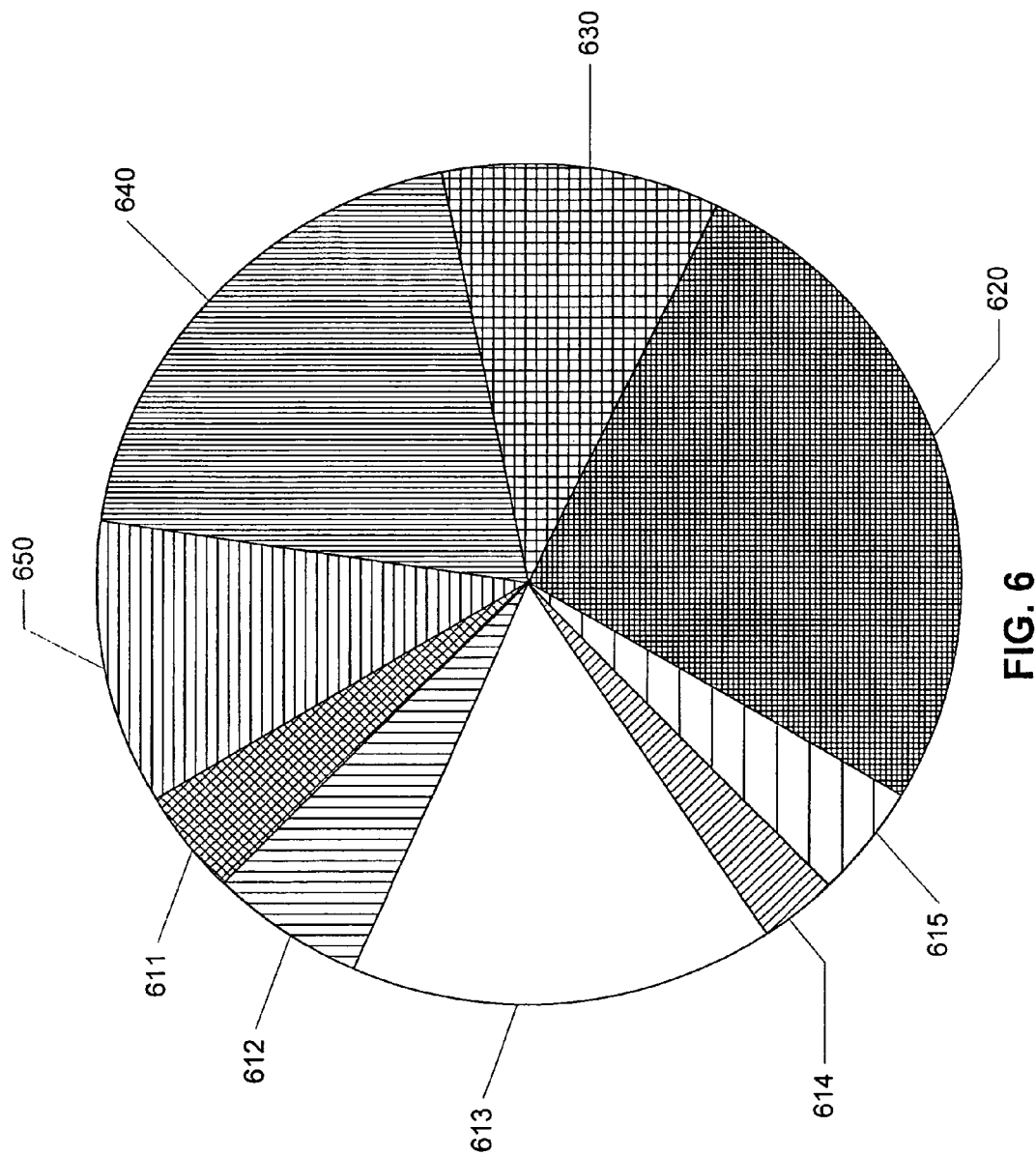
FIG. 6 depicts an example of weighting commodity components, consistent with an embodiment of the present invention.
Figure 7:
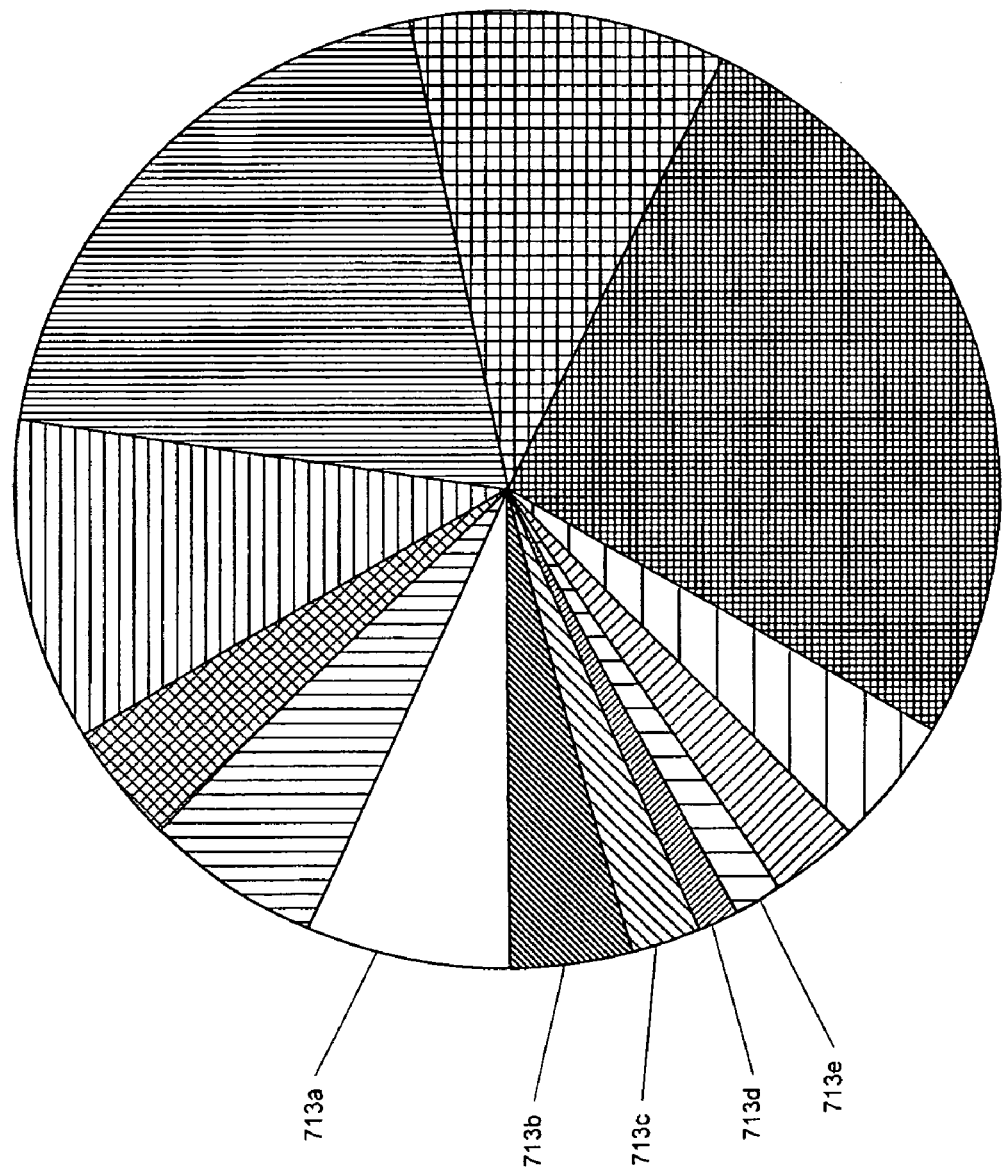
FIG. 7 depicts an example of weighting individual tenor components, consistent with an embodiment of the present invention.

FIGS. 5, 6, and 7, illustrate pie charts 401, 402, and 403, respectively, with greater detail. FIG. 5 illustrates a representation of a commodity index 501 for which five different sectors 510, 520, 530, 540, 550 are selected. In this example, each sector has a different weight. For example, sector 510 is assigned the greatest weight and sector 550 is assigned the least weight.

FIG. 6 illustrates a representation of the same commodity index illustrated in FIG. 5. The commodity index in this example comprises five sectors, where one of the sectors (510 in FIG. 5) is composed of five commodity components 611, 612, 613, 614, 615. In this example, each one of these commodity components 611, 612, 613, 614, 615 has a different weight. One or more commodity components are selected for each one of the four other sectors 650, 640, 630, 620, and a weight is calculated for each one of the commodity components. All the weights of components within one sector represent 100% of the sector.

FIG. 7 illustrates a representation of the same commodity index illustrated in FIG. 6. The commodity components of each one of the sectors may be further diversified between different tenors. For example, one of the commodity component (613 in FIG. 6) is shown divided into five different maturities 713a, 713b, 713c, 713d, 713e (each one is an individual tenor component) in FIG. 7. Each one of the individual tenor components may have a different weight. The weight may be used to purchase financial instruments corresponding to the individual tenor component.

Figure 8:
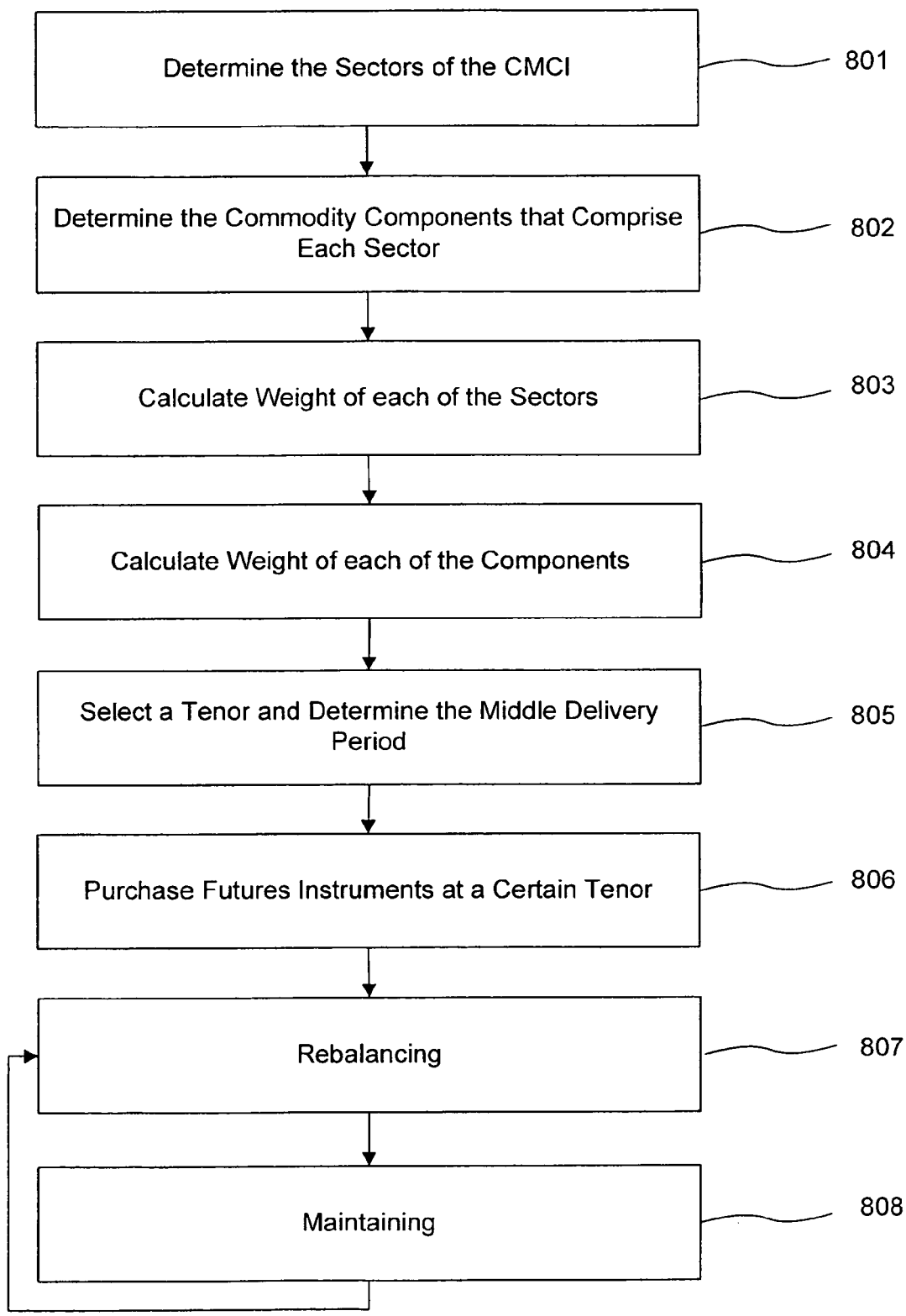
FIG. 8 is a flowchart of an exemplary method, consistent with an embodiment of the present invention.

FIG. 8 is a flowchart of an exemplary method, consistent with a disclosed embodiment, for providing a constant maturity commodity index ("CMCI"). According to the method, at step 801, sectors are selected that will make up a CMCI. A CMCI may include one or more different sectors. An investor may choose to invest in specific sectors or the sectors may be chosen based on a set of factors. These factors may include one or more of the following: determining whether to invest in a sector through a CMCI, which may help to overcome the problems posed by investing in the sector through other traditional means (e.g., the problems with contango discussed above); determining whether the investment in the sector should be profitable through a CMCI based on a set of predicted events (including, but not limited to, demand of various industries, demand due to economic growth because of industrialization/globalization); and determining whether changes are expected regarding the composition of a sector.

For example, when evaluating whether to include the energy sector in a CMCI, one may consider various factors such as recent fluctuation in the price of commodities within the sector, predicted weather conditions, recent events, and a comparison of conditions that caused demand in the past to current conditions. Examples of conditions to consider when deciding whether to invest in the precious metal markets include demand from the jewelry interest, low interest rates, surging industrial metal and energy prices, speculation that central banks plan to buy up precious metals, rising inflation, increasing geopolitical tension, and prospect of a weaker U.S. dollar. Other general considerations that might be relevant for evaluating a particular sector include urbanization trends of developing countries like China and India, rate in global economic growth, and relevant industry innovation.

Figure 9:
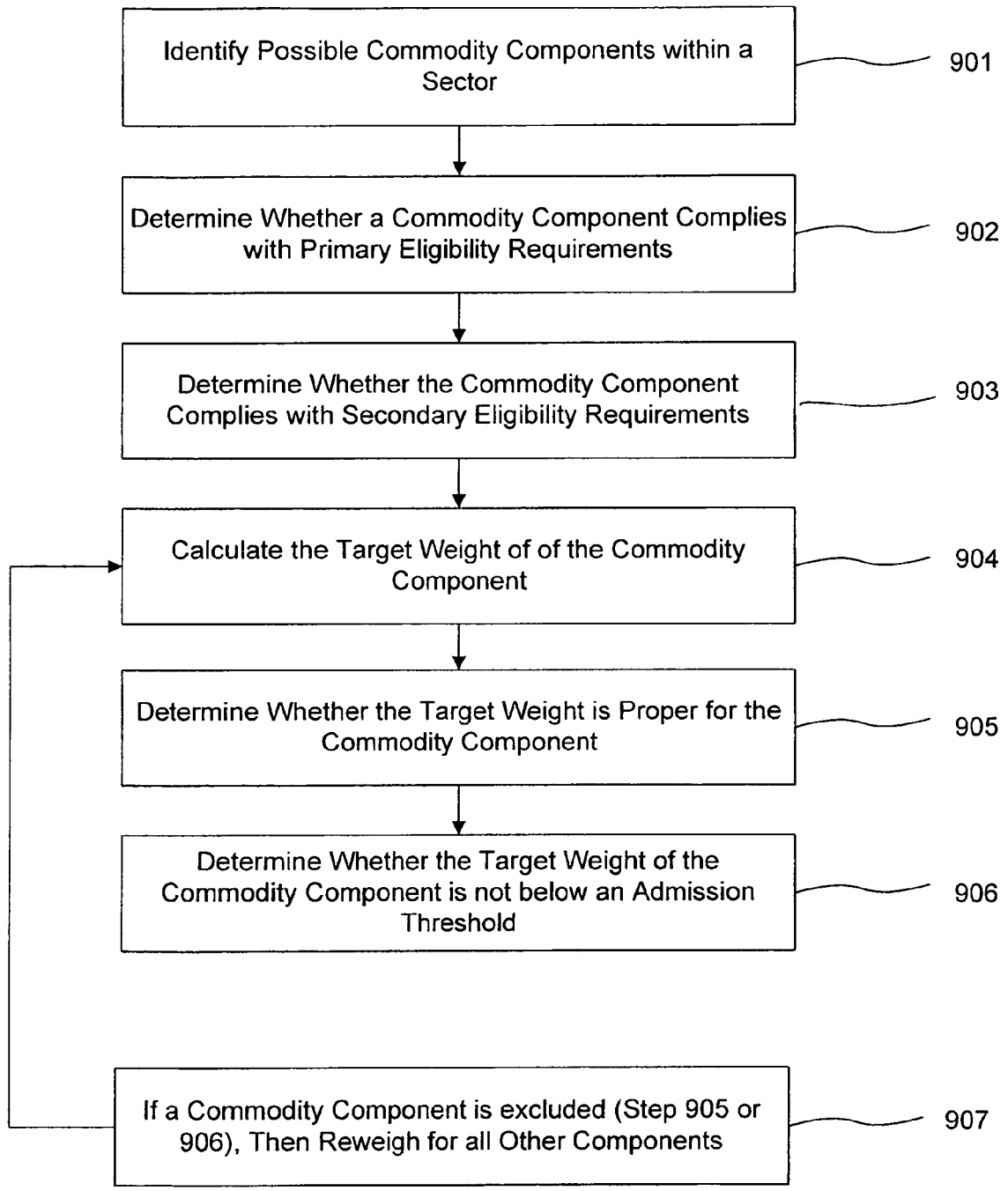
FIG. 9 is a flowchart of another exemplary method, consistent with an embodiment of the exemplary method depicted in FIG. 8.

Next, commodity components for each one of the sectors selected at step 801 are selected at step 802. One or more commodity components may be selected for each sector. A commodity component may need to meet a variety of eligibility requirements to be included in a CMCI. FIG. 9, which is discussed below in greater detail, further illustrates an example of a method for determining if a component may be part of a CMCI.

Figure 10:
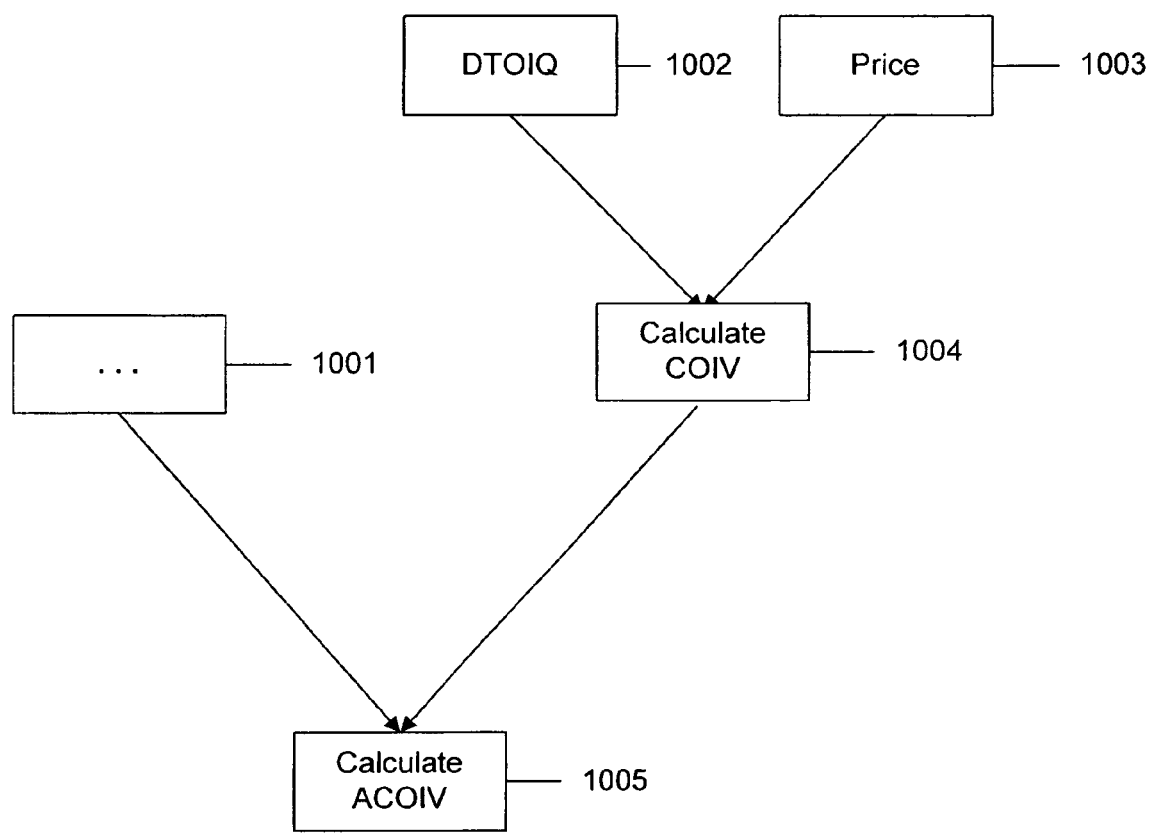
FIG. 10 is an exemplary diagram showing a calculation of an Average Component Open Interest Value.

Before calculating a weight of each of the commodity components within a sector, a weight for each one of the sectors selected in step 801 may be calculated in step 803. The weight of the sector may be based on a variety of data including the Consumer Price Index (CPI), Producers Price Index (PPI), and the Global Domestic Product (GDP) and the liquidity of the commodity components within the sector. FIG. 10 further illustrates an exemplary method for calculating the weight of each sector.

Figure 11:
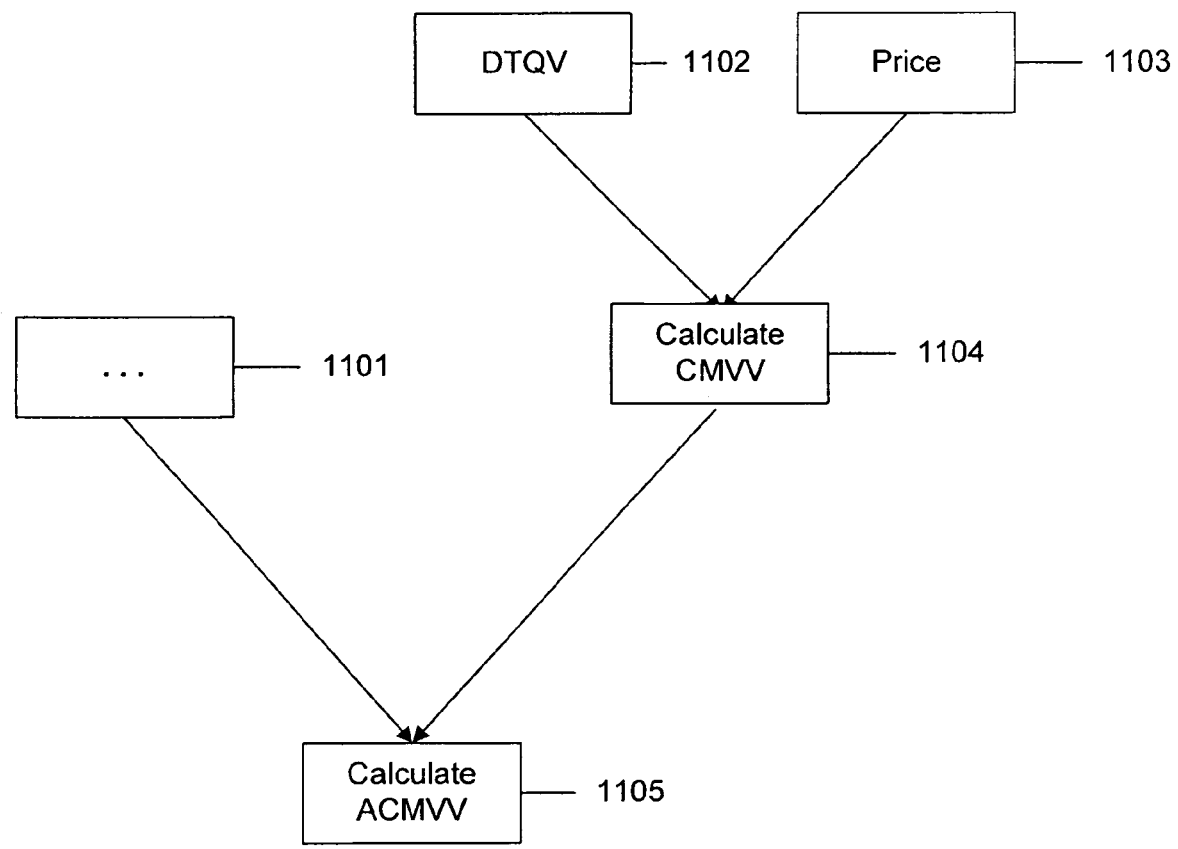
FIG. 11 is an exemplary diagram showing a calculation of an Average Component Market Volume Value.

After a weight is calculated for a sector, a weight may be calculated for the individual commodity components within a sector (step 804). The weight of each individual commodity component may be based on consumption data. FIG. 11 further illustrates an exemplary method for calculating the weight of each commodity component. Alternatively, before step 804, a tenor may be selected for each one of the components. The same tenor can be selected for all of the components in step 805.

At step 805, a middle delivery period ("MDP") may be determined for each of the components at a selected tenor. In one embodiment, the MDP represents the mid-point between the first and last day of a delivery period for a futures contract. The deliver period may be, for example, an entire calendar month or a designated portion of a month. The MDP then becomes the point in time when a portion of the index attritubale to a commodity is entirely allocated to one delivery month or the next. Prior and subsequent to the MDP, the CMCI may allocate the weight of the commodity between two surrounding contracts. The allocation may be determined in accordance with the concept of contract proportions. Based on the MDP, the weight of each futures contract at a certain tenor of the commodity index can then be determined.

At step 806, futures contracts or other financial instruments corresponding to each of the components at a certain tenor are purchased. The weight for a component may be evenly divided between financial instruments corresponding to time periods right before and right after the MDP.

After step 806 is completed, the composition of the index is complete. However, as time passes the value of the different components in the index fluctuates. At step 807, rebalancing may occur regularly to make sure that each component is at its proper weight as determined at step 804. At step 808, the index may be maintained by readjusting the weight of each of the components based on the change in factors used to calculate the weight. Alternatively, the weight of the component may be maintained by calculate a weight of each of the components again.

FIG. 9 is a flowchart of an exemplary method for determining if a component may be part of a CMCI. In step 901, components that are part of a commodity sector in the CMCI are identified. For each one of the components identified within one sector, step 902 to step 906 may be completed. If, at step 905 or 906 it is determined that a component cannot be part of the CMCI, steps 904 to step 906 may need to be repeated for all the components that were previously determined to be eligible to be included in the CMCI 907.

At step 902, a determination may be made regarding whether a commodity component complies with primary eligibility requirements. Financial instruments corresponding to a commodity at a certain tenor may be representative of the commodity component and may be traded on an exchange. Primary eligibility requirements may include requirements for evaluating the nature and technical characteristics (e.g., country of origin, trading characteristics, foreign exchange controls, availability and accuracy of contract used to trade the commodity component, price and volume data) of the financial instrument(s) corresponding to the commodity component. These requirements may ensure that only commodity components with reasonable economic significance are included in the index (CMCI). Primary eligibility requirements may comprise one or more requirements defined below.

A first possible determination is that the commodity component is a traded with a financial trading instrument based on a single commodity. The determination may include determining that the commodity represented by the commodity component is a raw material that is homogenous in nature, is consumed or used as input in a production process, and is tradable on an exchange.

Another possibility is determining whether the commodity component is physically deliverable into either a physical commodity or cash settled against a publicly available physical commodity reference price. Examples of publicly available physical commodity reference price include, but are not limited to Plats Marketsmay and Reuters.

A third possibility is determining if the commodity component is traded under acceptable circumstances. One such requirement may be listing or trading the commodity component (instrument) on an exchange that is based in an eligible country, which has an adequate system of law and regulations. Another requirement may be that the instrument be traded on an exchange that satisfies exchange eligibility requirements, such as having adequate governance and management procedures and trading on the exchange has been free of any significant market disruptions involving a major commodity for a predetermined amount of time. Another possible requirement is that a financial instrument corresponding to the commodity component is traded on the exchange in line with a set of trading requirements. For example, the financial instrument may need to be available for trading for at least a predetermined amount of time before maturing, daily settlement or closing prices for the financial instrument may need to be made available by the exchange, and the financial instrument may need to be made available for trading for at least a predetermined minimum trading time each day on the exchange.

Additional examples of preliminary requirements include determining whether the instrument features clearly specified expirations and terms, determining whether the instrument is neither a cash market nor a spot instrument, determining whether the price and volume data has been available for the instrument at least a predetermined amount of time before the current date, and determining whether the instrument satisfies criteria of calculability.

In step 902, if it is determined that a commodity component does not comply with one of the primary eligibility requirements, it is excluded from the commodity index. If a component complies with primary eligibility requirements, a determination must be made whether that component complies with secondary eligibility requirements (step 903) for it to be included in the index. The secondary eligibility requirements may ensure that the commodity component meets certain financial thresholds based on liquidity. Liquidity may be based on the combination of "open interest" and market volume. "Open interest" may indicate how much outstanding interest there is for all futures instruments corresponding to a commodity component or for a futures instrument for a commodity component at a specific tenor. Past and future liquidity of a financial instrument may be gauged based on its open interest. Market volume reflects the number of contracts (of the same type as the financial instruments representative of the commodity component) that are traded in a given period of time. Accordingly, immediate interest for a financial instrument may be gauged based on its market volume.

For example, in step 903, to determine that a component meets secondary eligibility requirements, the Average Component Open Interest Value ("ACOIV") should exceed a predetermined amount and the Average Component Market Volume Value ("ACMVV") should represent at least a predetermined proportion of the ACOIV (903). ACOIV may be based on an average of a number of the most recently calculated open interest values for a financial instrument corresponding to a commodity component. ACMVV may be based on an average of a number of the most recently calculated market volume values for a financial instrument corresponding to a commodity component.

In order to determine an ACOIV (see, e.g., FIG. 10, 1005) and an ACMVV (see, e.g., FIG. 11, 1105) for a commodity component, at least one current Component Open Interest Value ("COIV") and one current Component Market Volume Value ("CMVV"), respectively, are determined (1004, 1104).

FIG. 10 is an exemplary diagram showing a calculation of an ACOIV for a commodity component. A COIV is calculated (1004) based on a Daily Total Open Interest Quantity ("DTOIQ") 1002 as reported by the exchange with which the component is associated and a nearby price of the contract ("Price") 1003. DTOIQ 1002 is the total number of open interest on all traded contracts or maturities multiplied by the number of units of such commodity per contract. The COIV may be calculated over a certain period of time before the date of calculation (or Calculation Reference Date ("CRD")). A calculation reference date may be any date on which at least a full calendar year of data is available for all the commodity components in a CMCI.

An ACOIV may be calculated (1005) for the most recently calculated COIV and three previously calculated COIVs 1001 for the commodity component. The ACOIV may be the weighted average of the four most recently calculated COIVs. The four most recently calculated COIVs may be weighted differently. For example, 35% may be the weight assigned for the most recently calculated COIV, and 30%, 25% and 10%, respectively, for the three COIVs calculated previously.

FIG. 11 is an exemplary diagram showing a calculation of an ACMVV for a commodity component. A CMVV may be calculated (1104) based on a Daily Total Volume Quantity ("DTVQ") 1102 and Price 1103. DTQV 1102 is the number of financial instruments corresponding to the commodity component exchanged between buyers and sellers. The CMVV may be calculated by multiplying the DTQV 1102 by the number of units of commodity in the contract represented by the financial instruments corresponding to the commodity component.

An ACMVV may be calculated (1105) for the most recently calculated CMVV and the three previously calculated CMVVs 1101 for the commodity component. The ACMVV may be the weighted average of the four most recently calculated CMVVs. The four most recently calculated CMVVs may be weighted differently. For example, 35% may be the weight assigned for the most recently calculated CMVV, and 30%, 25% and 10%, respectively, for the three CMVVs calculated previously.

Returning to FIG. 9, the next step in determining whether a commodity component should be included in the index is calculating the target weight of the component (step 904). In particular, a determination is made whether the target weight for the commodity component is proper for the commodity (step 905). Next in step 906, a commodity component is excluded if it is determined that its calculated weight is below a certain threshold. If the component is excluded after either determination (905, 906), then all the components weighed before may need to be reweighed (step 907).

Figure 12:
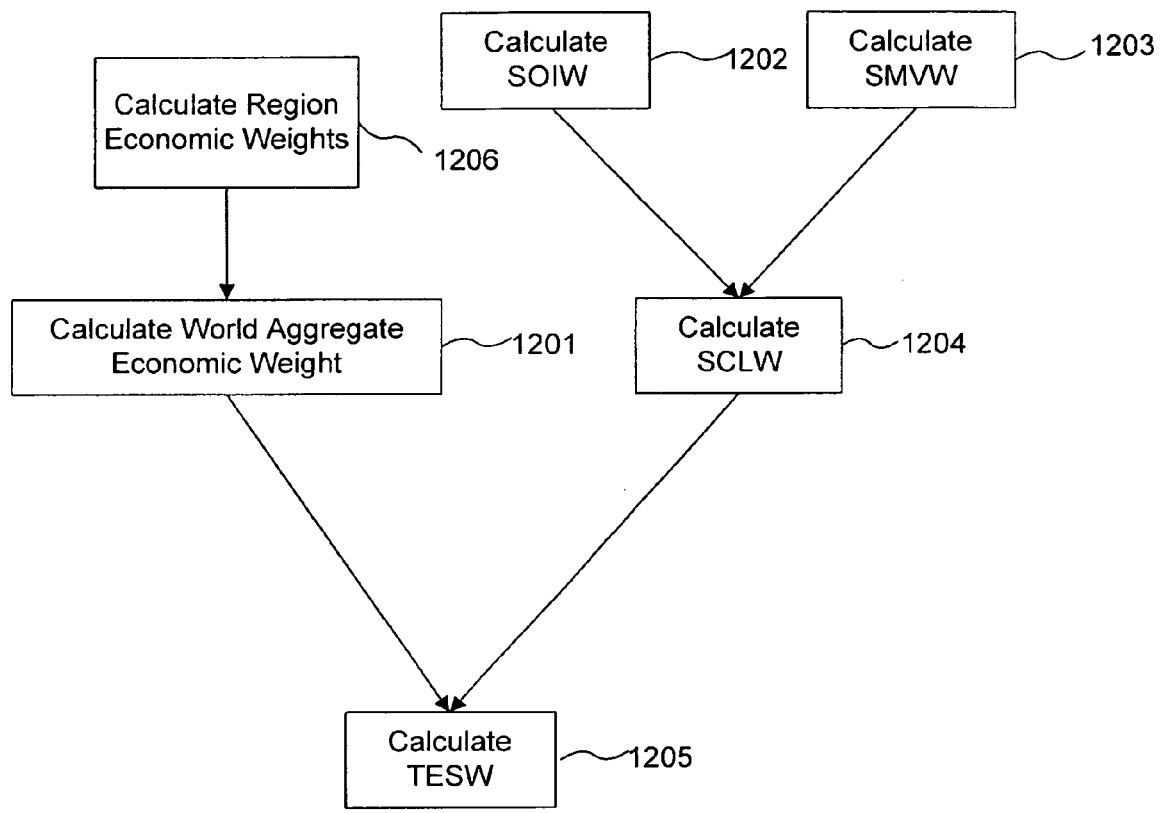
FIG. 12 is an exemplary diagram showing a calculation of the weight of a sector.

FIG. 12 is an exemplary diagram showing a calculation of the weight of a sector (Tradable Economic Sector Weight ("TESW")) in a commodity index. A TESW is based on a world aggregate economic weight and a Sector Combined Liquidity Weight ("SCLW") 1205. A world aggregate economic weight for the sector is calculated (1201). First, the region economic weight may be calculated (1206) by multiplying the combined CPI/PPI weight by the share of global GDP for each region. Possible categories of regions include, but are not limited to: U.S., European Union, and Japan. For example, CPI may be assigned a weight of ⅔ and PPI may be assigned a weight of ⅓. A world aggregate weight may be then calculated (1201) based on the region aggregate economic weights of the different regions.

The SCLW 1204 for a sector may be based on the sector's Sector Open Interest Weight ("SOIW") 1202 and the sector's Sector's Market Value Weight ("SMVW") 1203. A SOIW 1202 of a sector may be calculated based on the sum of the ACOIVs (1005) of the components within the sector 1002. A SMVW 1203 of a sector may be calculated based on the sum of the ACMMVs (1105) of the components within sector 1203. A SCLW 1204 may be calculated as follows:

$$SCLW = \frac{1}{2}SOIW + \frac{1}{2}SMVW.$$

The TESW for a sector may be calculated as follows:

$$TESW = \frac{2}{3}WorldEconomicAggregateWeight + \frac{1}{3}SCLW.$$

Figure 13:
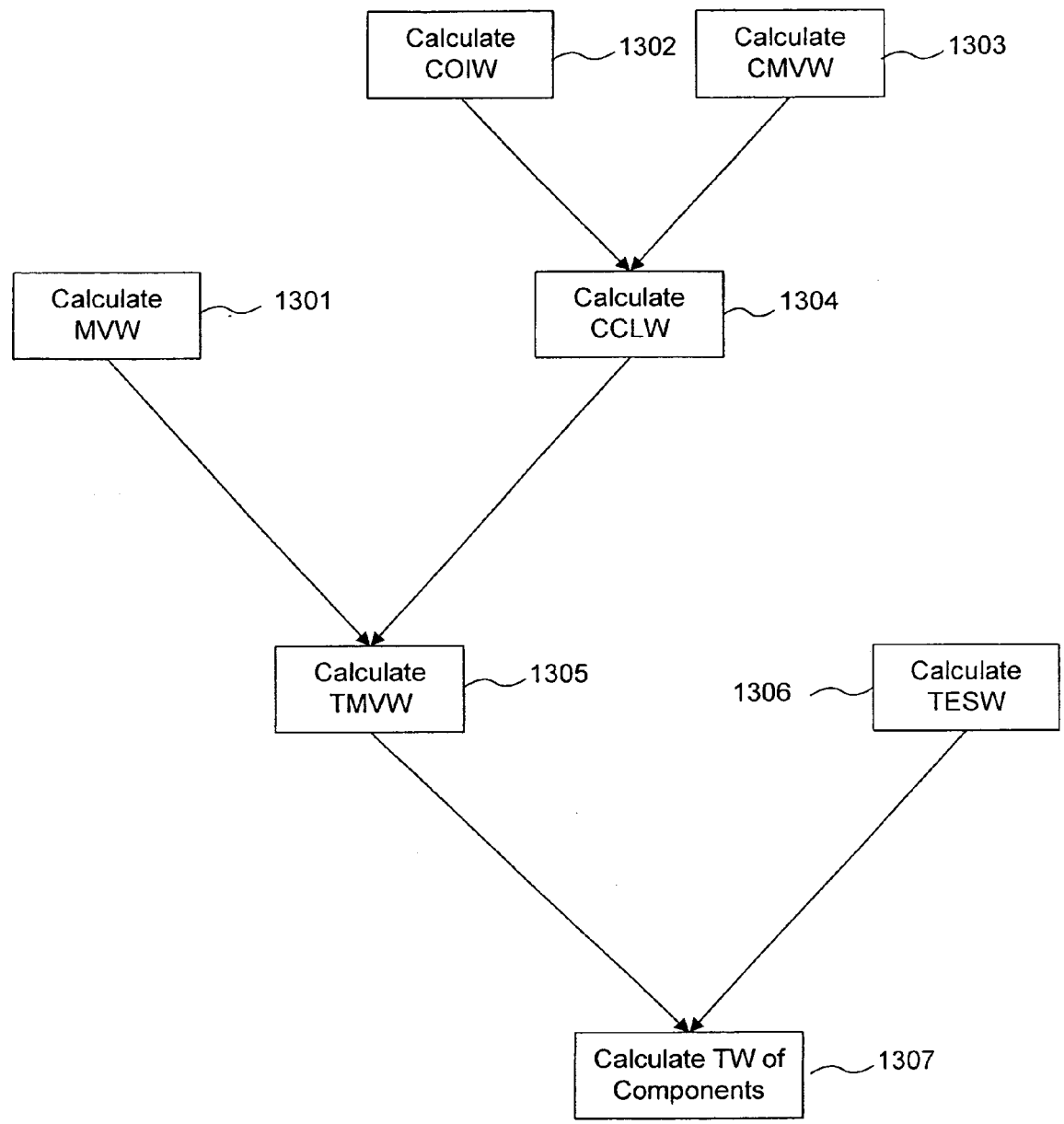
FIG. 13 is an exemplary diagram showing a calculation of the weight of a component.

FIG. 13 is an exemplary diagram showing a calculation of the weight of a commodity component (Tradable Weight ("TW")) within a sector. A commodity component's TW 1307 may be based on the value of the commodity component's Tradable Market Value Weight ("TMVW") 1305 and the TESW 1306 of the sector of the commodity component. A TMVW 1305 may be calculated based on the MVW 1301 of the commodity component (see, for example, FIG. 14) and its Combined Component Liquidity Weight ("CCLW") 1304. A CCLW 1304 may be based on the commodity component's COIW 1302 and the commodity component's CMVW 1303. A description of the method for calculating the values for the COIW 1302 and the CMVW 1303 of a commodity component are described above in the description of FIG. 9, where the values are calculated to determine the liquidity of the commodity component. Here, COIW 1302 may be calculated as the sum of the commodity component's ACOIV divided by the sum of ACOIVs:

$$COIW = \frac{ACOIV}{\sum ACOIV}.$$

CMVW 1303 may be calculated as the sum of the commodity component's ACMVV divided by the sum of $$ACMVV: CMVW = \frac{ACMVV}{\sum ACMVV}.$$

COIW 1302 and CMVW 1303 are combined to calculate the CCLW 1304. For example, CCLW 1304 may be calculated as follows:

$$CCLW = \frac{1}{2}CTOIW + \frac{1}{2}CMVW.$$

Figure 14:
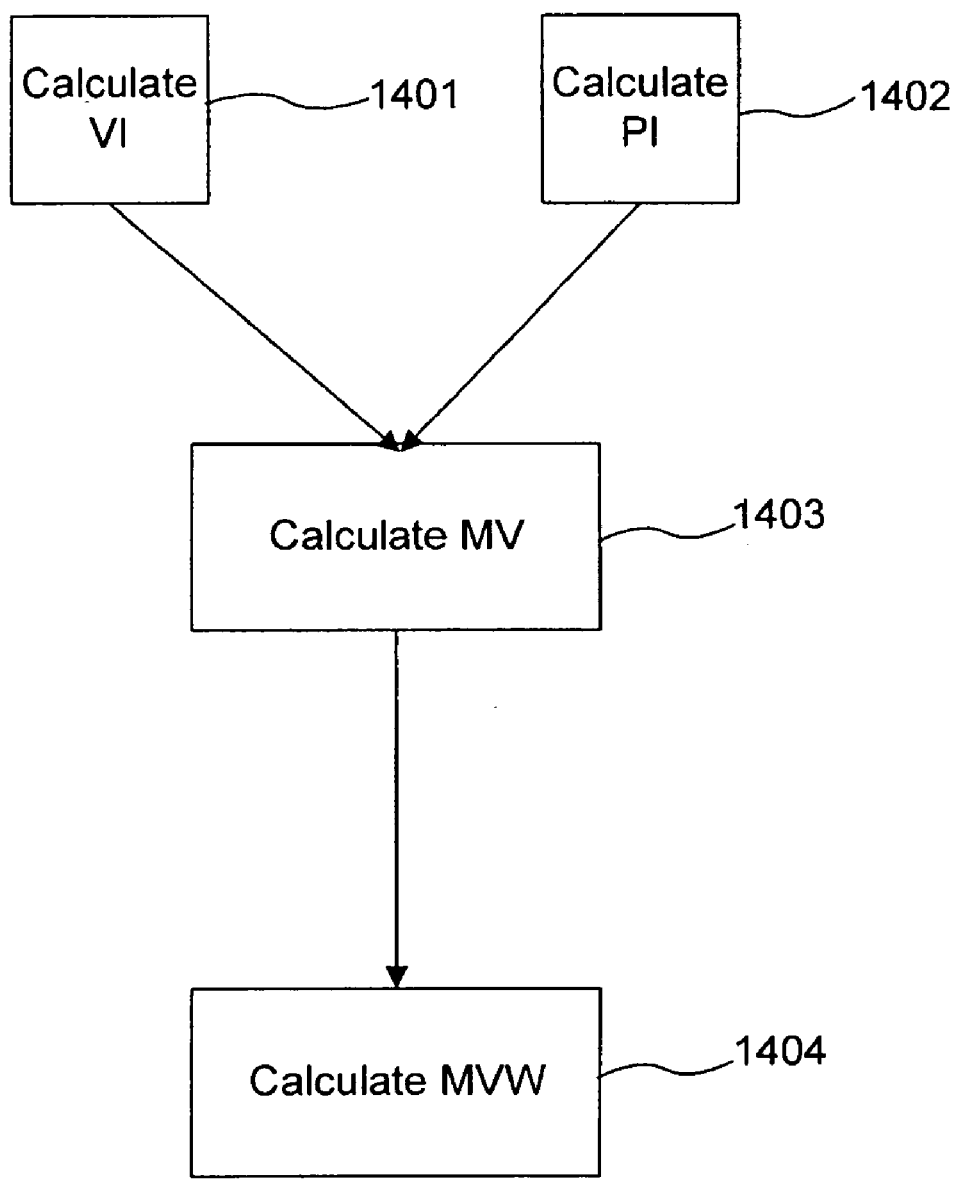
FIG. 14 is an exemplary diagram showing a calculation of a Market Value Weight.

FIG. 14 is an exemplary diagram showing a calculation of the MVW. Market Value of consumption ("MV") 1403 is used to calculate the MVW 1404 of each commodity component 1301. A MV 1403 for a commodity component may be calculated based on a Volume Indicator ("VI") 1401 for the commodity and a Price Indicator ("PI") 1402. A VI 1401 may be equal to the total annual consumption data for the most recent calendar year 1401. API 1402 may be equal to the average of the prices for a financial instrument corresponding to the commodity component over a number of year periods measured using nearby delivery months of each futures strip during the last certain number of day of each month during the number of years 1402. A determination may be made whether to use regional or world data when calculating the VI 1401 or the PI 1402 in connection of a particular commodity based on a set of factors, such as: use of the commodity, pricing of the commodity, production of the commodity, consumption of the commodity, or transportation of the commodity. The MV 1403 for a certain commodity component may be calculated as follows: MV=VI×PI A TMVW 1305 of a commodity component may be calculated based on the CCLW 1304 of the commodity component and the MVW 1301 of the commodity component as follows:

$$TMVW = \frac{2}{3}CCLW + \frac{1}{3}MVW.$$

Finally, a TW 1307 of a commodity component within an index is calculated by blending the TMVW 1305 of the commodity component and the TESW 1306 of the sector that the commodity component is part of.

As described above, each commodity component within an index may correspond to a commodity with a certain maturity. In an alternate embodiment, the same commodity may be diversified across multiple maturities (see, for example, FIG. 7). As a result, multiple futures instruments 713*a*, 713*b*, 213*c*, 713*d*, 713*e* may be bought for the same commodity component at different tenors. As discussed above, a commodity component at a certain tenor is also referred to as an individual tenor.

Figure 15:
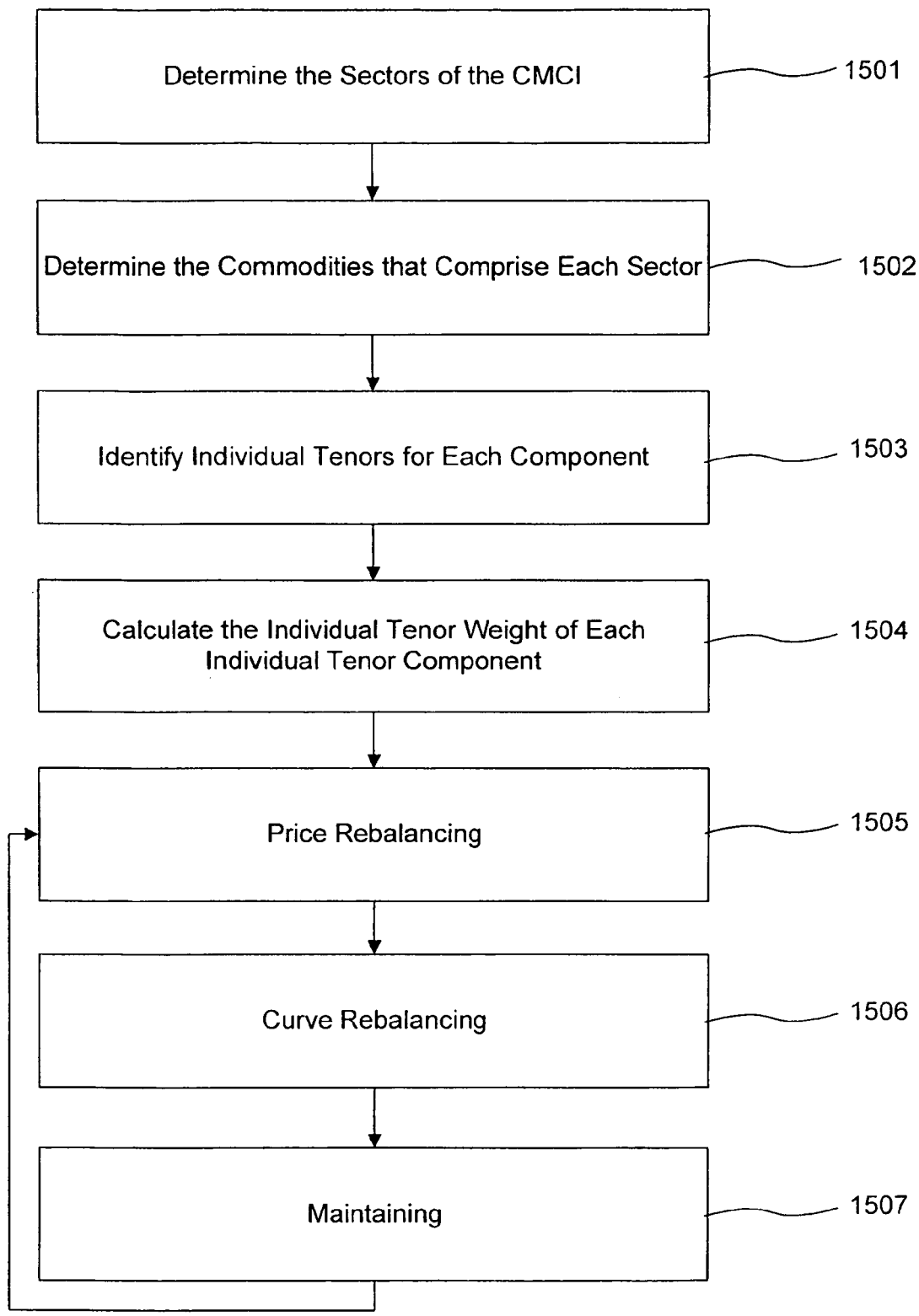
FIG. 15 is a flowchart of an additional exemplary method, consistent with an embodiment of the present invention.

FIG. 15 is a flowchart of an exemplary method for diversifying across an index across different sectors, different commodities within each sector, and different tenors for each commodity. This method is consistent with the exemplary method discussed above with reference to FIG. 8.

At step 1501, the sectors that are included in the index are determined. At step 1502, the commodities that are included within each sector are determined. At step 1503, the individual tenor components available for each commodity are determined based on the different tenors available for the commodity. Next, a determination is made as to what individual tenor components of each commodity are included in the index (step 1503). At step 1504, an Individual Tenor Weight ("ITW") is calculated for each individual tenor component.

Calculating an ITW for each individual tenor component is described below in more detail in connection with FIG. 16. Since there may be individual tenor components corresponding to multiple maturities for multiple commodities in an index, the index may need to be weighed across the different commodities and across the different maturities of each commodity to determine the weight of each individual component (step 1504). As a result, rebalancing occurs to rebalance the commodity components to their target weights (step 1505) and rebalancing occurs across the individual tenor components (step 1506) to ensure that respective segments of the forward curve (different maturities) on each commodity component is weighted properly according to the ITW of the individual tenor component.

Figure 16:
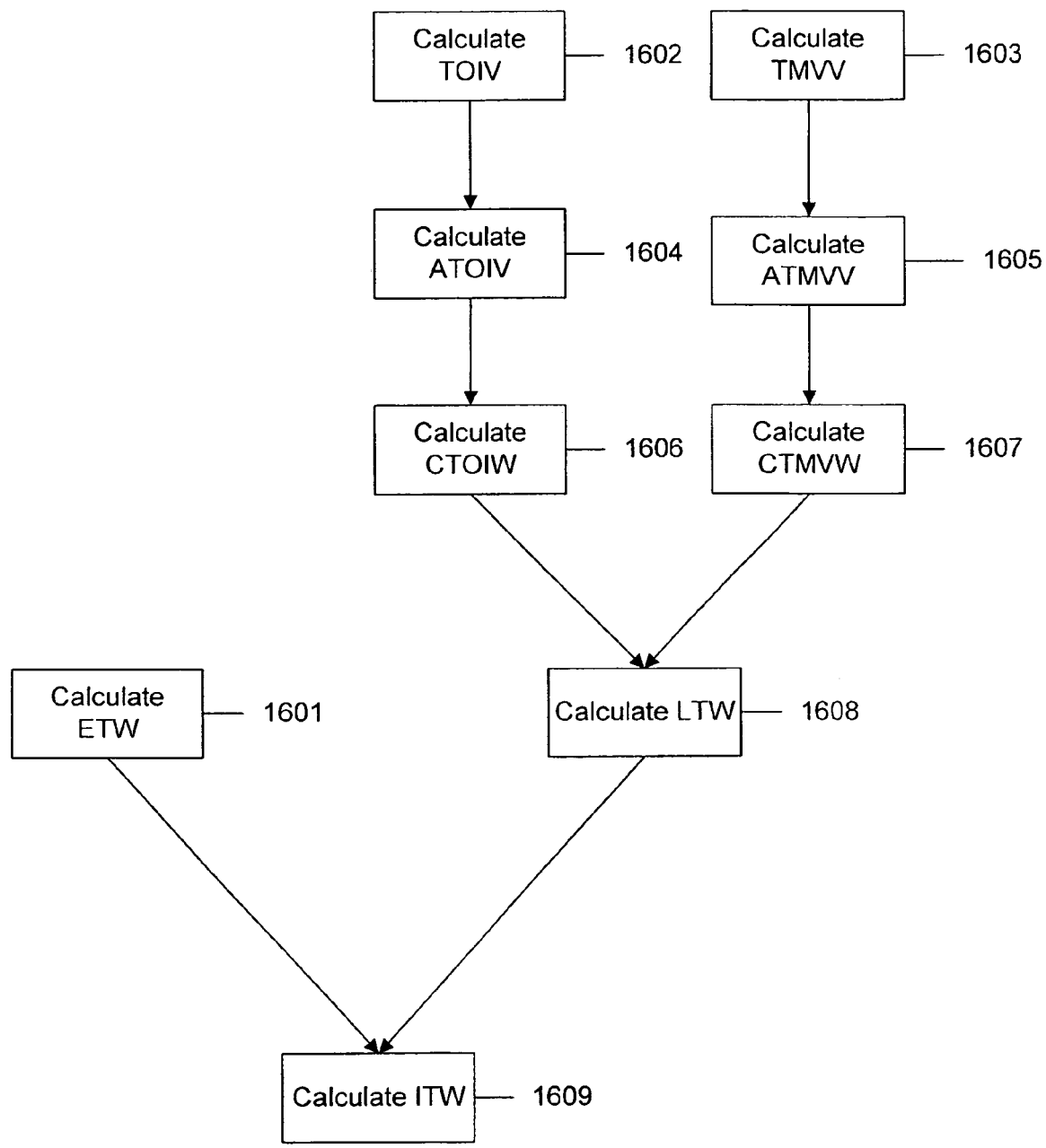
FIG. 16 is an exemplary diagram showing a calculation of a Individual Tenor Weight.

FIG. 16 is an exemplary diagram showing a calculation of the ITW. The ITW is calculated for futures contracts of a certain commodity at a certain tenor. An individual tenor component refers to the financial instruments bought for a certain commodity at a certain tenor. The ITW, is the weight obtained from the blending of Liquidity Tenor Weight (LTW) and Equal Tenor Weight (ETW) for a given individual tenor component. The ITW may be calculated as follows, for example:

$$ITW = \frac{1}{4}ETW + \frac{3}{4}LTW.$$

An ETW 1601 is obtained by allocating an equivalent weight to each individual tenor component. For example, if there are four individual component tenors for a certain component, each one would have a 25% equal tenor weight.

An LTW 1608 reflects the relative liquidity of the individual tenor components corresponding to a commodity component. An LTW 1608 may be calculated based on the Component Tenor Open Interest Weight (CTOIW) 1606 and the Component Tenor Market Volume Weight (CTMVW) 1607. An LTW 1608 may be calculated as follows, for example:

$$LTW = \frac{1}{2}CTOIW + \frac{1}{2}CTMVW.$$

A CTOIW 1606 is based on open interest data for a certain individual tenor component. A CTOIW 1606 may be calculated based on the Average Tenor Open Interest Value (ATOIV) 1604. An ATOIV 1604 is the weighted average of, for example, the four most recently calculated Tenor Open Interest Values (TOIVs) 1302. The four most recently calculated TOIVs may be weighted differently. For example, 35% may be the weight assigned for the most recently calculated TOIV 1602, and 30%, 25% and 10%, respectively, for each one of the TOIVs calculated for the previous three periods.

A TOIV 1602 may be equivalent to the U.S. Dollar value of the open interest on a futures contract for a commodity at a certain individual tenor (individual tenor component) over a certain specified period of time. A TOIV 1602 may be calculated based on the daily open interest reported by the exchange facility where the specified futures contract is traded.

A CTMVW 1607 may be based on market value for a certain individual tenor component at a certain tenor. A CTMVW 1607 may be calculated based on the Average Tenor Market Volume Value (ATMVV) 1605. An ATMVV 1605 is the weighted average of, for example, the four most recently calculated Tenor Market Volume Values (TMVV). The four most recently calculated TMVVs may be weighted differently. For example, 35% may be the weight assigned for the most recently calculated TMVV 1603, and 30%, 25% and 10%, respectively, for each one of the TMVVs calculated for the previous three periods.

A TMVV 1603, for example, is the U.S. Dollar value of the volume of a given futures contract for a commodity component (individual tenor component) that is traded over a certain specified period of time. A TMVV 1603 may be calculated based on market volume information disclosed by commercially reliable sources (such as reports by brokers or dealers, market volume reports, official statistics, etc.)

Figure 17:
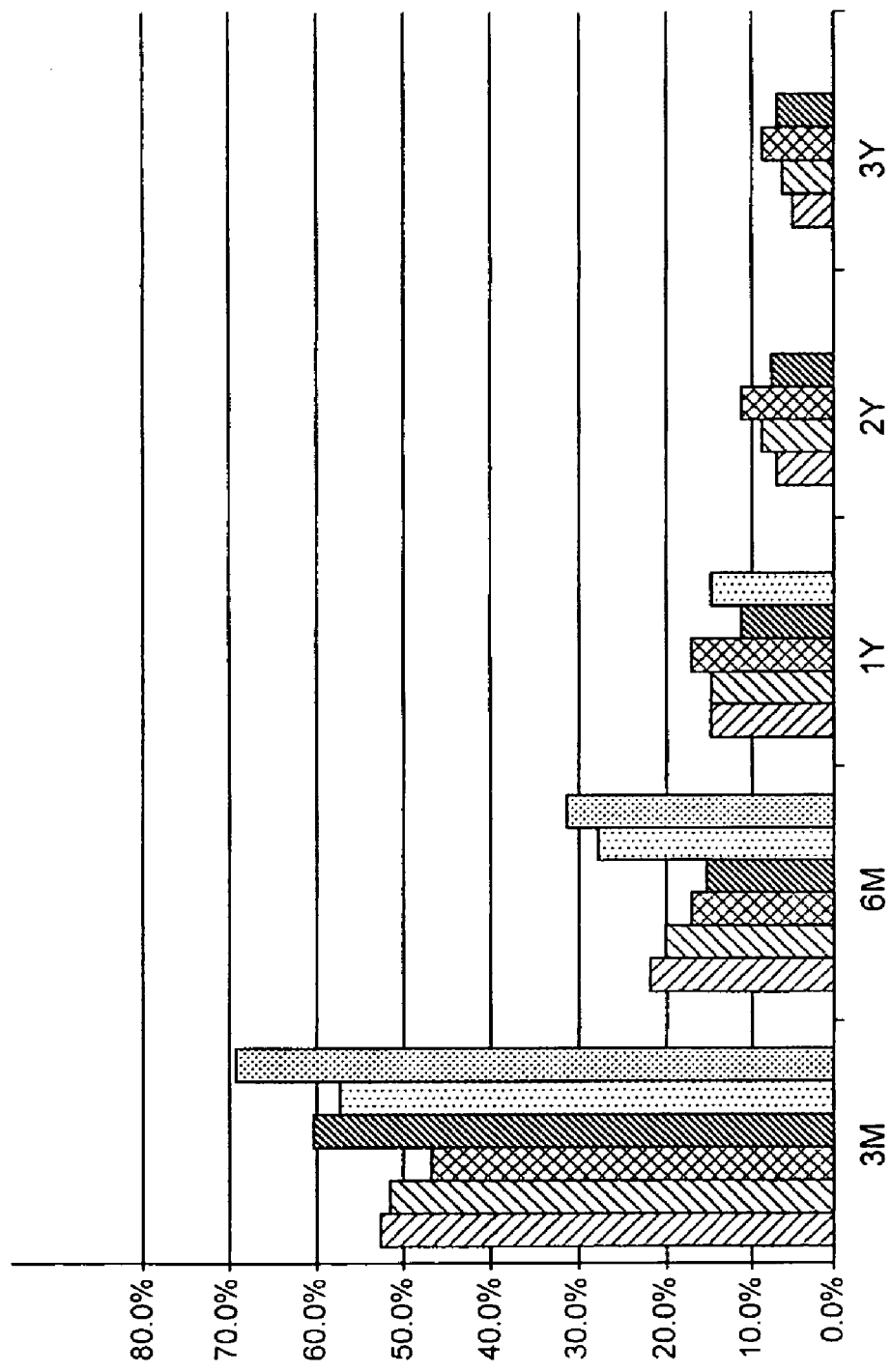
FIG. 17 depicts an example of distribution of investment in commodities over a multiple number of maturities for a number of different commodities.

FIG. 17 depicts distribution of investment in commodities over a multiple number of maturities for a number of different commodities. Each vertical bar with a pattern represents an individual tenor component. Each pattern on a bar represents a different commodity. The bars are divided into five different categories based on maturity (tenor) of the individual tenor components: 3M (months), 6M, 1Y (year(s)), 2Y, and 3Y. The vertical Y axis represents the weight of the individual tenor component represented by a bar with regards to a certain commodity. The addition of the Y values of all the bars with the same patter equals 100%.

Figure 18:
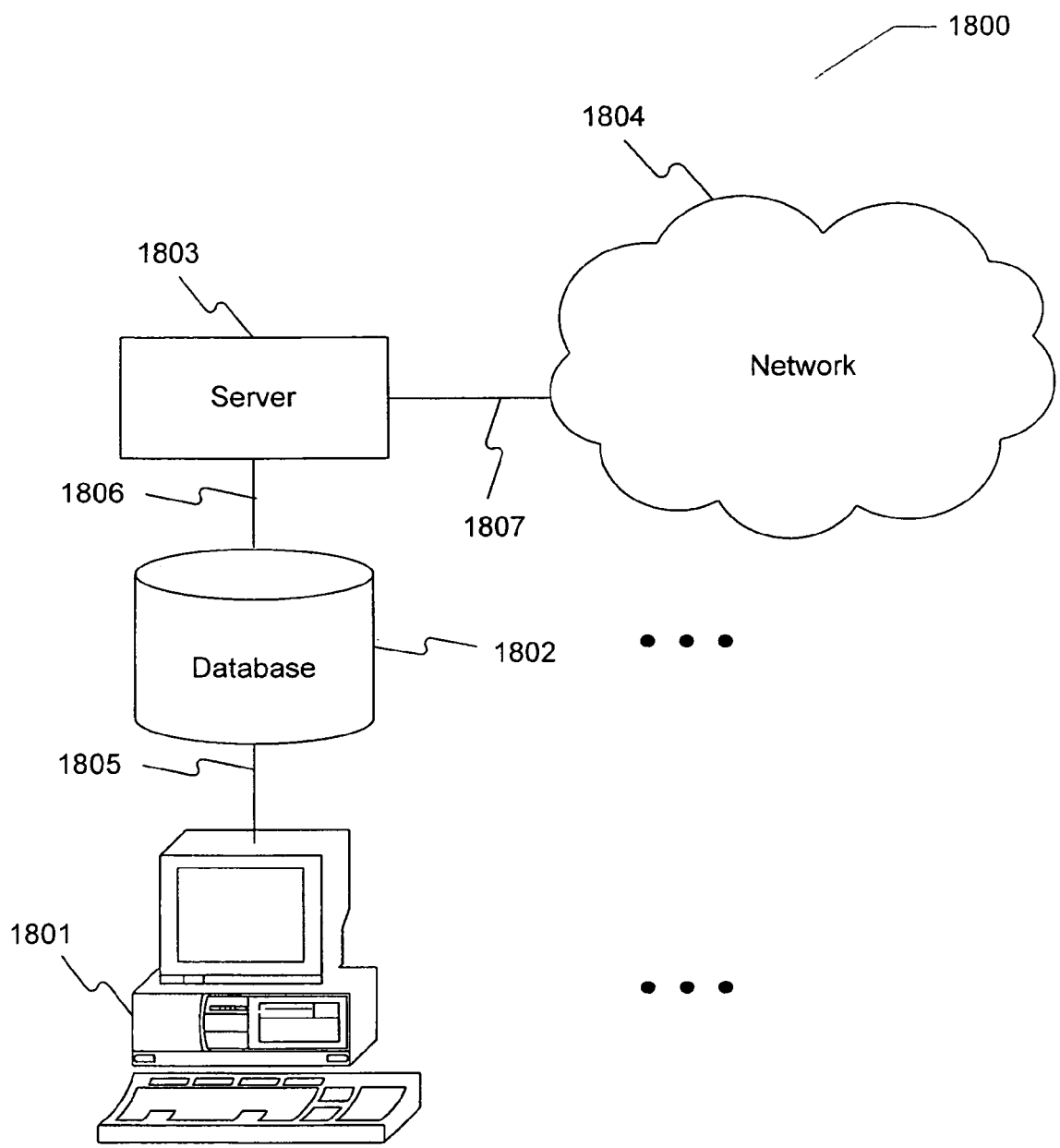
FIG. 18 illustrates an exemplary system 1800, consistent with an embodiment of the invention.

FIG. 18 illustrates components of an exemplary computerized system 1800, consistent with an embodiment of the present invention for implementing the exemplary methods and features disclosed herein. System 1800 may include a computer workstation 1801, a database 1802, and a server 1803 connected to a network 1804. The system may also include multiple workstations, multiple databases, and/or multiple servers. The workstation 1801, database 1802, and server 1803 server may also be on the same or different computer systems. Examples of such computer systems include personal computers, servers, and handheld computers. The components may communicate with each over data links 1805, 1806, 1807.

The server 1803 may be able to access information about different commodities through a network 1804. The network 1804 may be an intranet that is connected to other servers or workstations that store relevant information. The network 1804 may also be the Internet. The server 1804 may be able to access information that is stored and updated on external servers. The information on external services may be maintained by various financial organizations (e.g., Bloomberg) and other similar entities.

The server 1803 may be able to store the information in the database 1802. The database 1803 may store information regarding a commodity index. This information may include information about the components in the commodity index and the weight of each component. The database 1802 may also store other relevant information necessary to perform the various calculation, adjustments, and determinations discussed above. The various calculations, adjustments, and determinations can be performed by a processor on either the server 1803 or workstation 1801.

A user may use the workstation 1801 to access information that is stored in the database 1802. The user may also use the workstation 1801 to select information for download by the server 1803 from network 1804, and storage in the database 1802. A user may also use the workstation 1801 to generate a commodity index and monitor its performance.

Commodity system environments, similar to FIG. 18, can be used by financial institutions or exchanges to generate or provide commodity indices. Based on the commodity indices, including constant maturity commodity indices consistent with the present invention, financial or investment products may be offered to financial professionals, financial organizations, investors, and other members of the public.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, microprocessors and the like. Additionally, although aspects of the invention are described for being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets. One or more of such software sections or modules can be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A method for providing a commodity index, the method being implemented by at least one processor and comprising:
selecting at least one commodity component for inclusion in the commodity index;
calculating, via the at least one processor, a target weight of the commodity component;
selecting a time interval for maturity of the commodity component to be fixed at from a current date;
determining a middle delivery period for financial instruments for the commodity component at the selected time interval;
purchasing the financial instruments in relation to the middle delivery period based on the target weight; and
rebalancing the financial instrument based on the target weight and the middle delivery period of the commodity component.

2. The method according to claim 1, further comprising selecting one or more sectors of the commodity index, wherein the commodity component is included in one of the sectors.

3. The method according to claim 2, further comprising determining a sector weight for each of the sectors.

4. The method according to claim 1, further comprising maintaining the target weight.

5. The method according to claim 4, wherein maintaining comprises: calculating a new component nominal weight for the commodity component, wherein the target weight of the commodity component for a next period is equal to the component nominal weight, if it is a maintenance period.

6. The method according to claim 4, wherein maintaining occurs every second predetermined amount of time.

7. The method according to claim 1, wherein the commodity component is held in form of the financial instruments at a quantity in a proportion related to a time distance to a constant maturity tenor.

8. The method according to claim 1, wherein rebalancing occurs every first predetermined amount of time.

9. The method according to claim 1, wherein the middle delivery period is the mid-point between the first and last day of a delivery period for the financial instruments.

10. The method according to claim 1, wherein the financial instruments are not front month contracts.

11. A method for providing a commodity index, the method being implemented by at least one processor and comprising:

selecting a plurality of commodities for the commodity index;

calculating, via the at least one processor, a target weight for each of the plurality of commodities;

identifying multiple individuals tenor components for each of the plurality of commodities, wherein an individual tenor component is a commodity at a certain maturity;

calculating an individual tenor weight for each of the multiple individual tenor components; and purchasing financial instruments corresponding to the multiple individual tenor components based on the calculated individual tenor weights.

12. The method according to claim 11, further comprising:

rebalancing the financial instruments based on the target weight of each of the plurality of commodities and the calculated individual tenor weights of the multiple individual tenor components.

13. The method according to claim 12, further comprising maintaining the target weight of each of the commodities and the calculated individual tenor weights of the multiple individual tenor components.

14. The method according to claim 13, wherein maintaining further comprises:

determining whether it is a maintenance period;

determining whether it is a curve rebalancing period;

calculating a target weight adjustment factor for the each of the multiple individual tenor components if it is a curve rebalancing period; and calculating the individual tenor weight for the each of the multiple individual tenor components based on the target weight adjustment factor.

15. The method according to claim 11, wherein calculating the individual tenor weight comprises:

calculating an equal tenor weight for the individual tenor component, the equal tenor weight is equal to the equal tenor weight of any one of multiple individual tenor components of the same commodity;

calculating a liquidity tenor weight for the individual tenor component; and calculating the individual tenor weight based on the equal tenor weight and the liquidity tenor weight.

16. The method according to claim 15, wherein calculating the liquidity tenor weight comprises:

calculating a component tenor market volume weight for the individual tenor component, comprising:

calculating a tenor market volume value based on a market volume and tenor of the individual tenor component over a liquidity reference period, calculating an average tenor market volume value of the individual tenor component based on the tenor market volume value, and calculating the component tenor market volume weight based on the average tenor market volume value; and calculating a component tenor open interest weight for the individual tenor component, comprising:

calculating a tenor open interest value based on the value of the open interest and tenor of the individual tenor component over the liquidity reference period;

calculating an average tenor open interest value for the individual tenor component based on the tenor open interest value;

calculating the component tenor open interest weight based on the average tenor open interest value; and calculating the liquidity tenor weight based on the component tenor market volume weight and the component tenor open interest weight.

* * * * *